Jan. 31, 1939.  R. CHILTON  2,145,685
MEANS FOR ASSISTING TAKE-OFF
Filed Oct. 5, 1937  7 Sheets-Sheet 1

INVENTOR
ROLAND CHILTON
BY
ATTORNEY

Jan. 31, 1939. R. CHILTON 2,145,685
MEANS FOR ASSISTING TAKE-OFF
Filed Oct. 5, 1937 7 Sheets-Sheet 2

INVENTOR
ROLAND CHILTON
BY
ATTORNEY

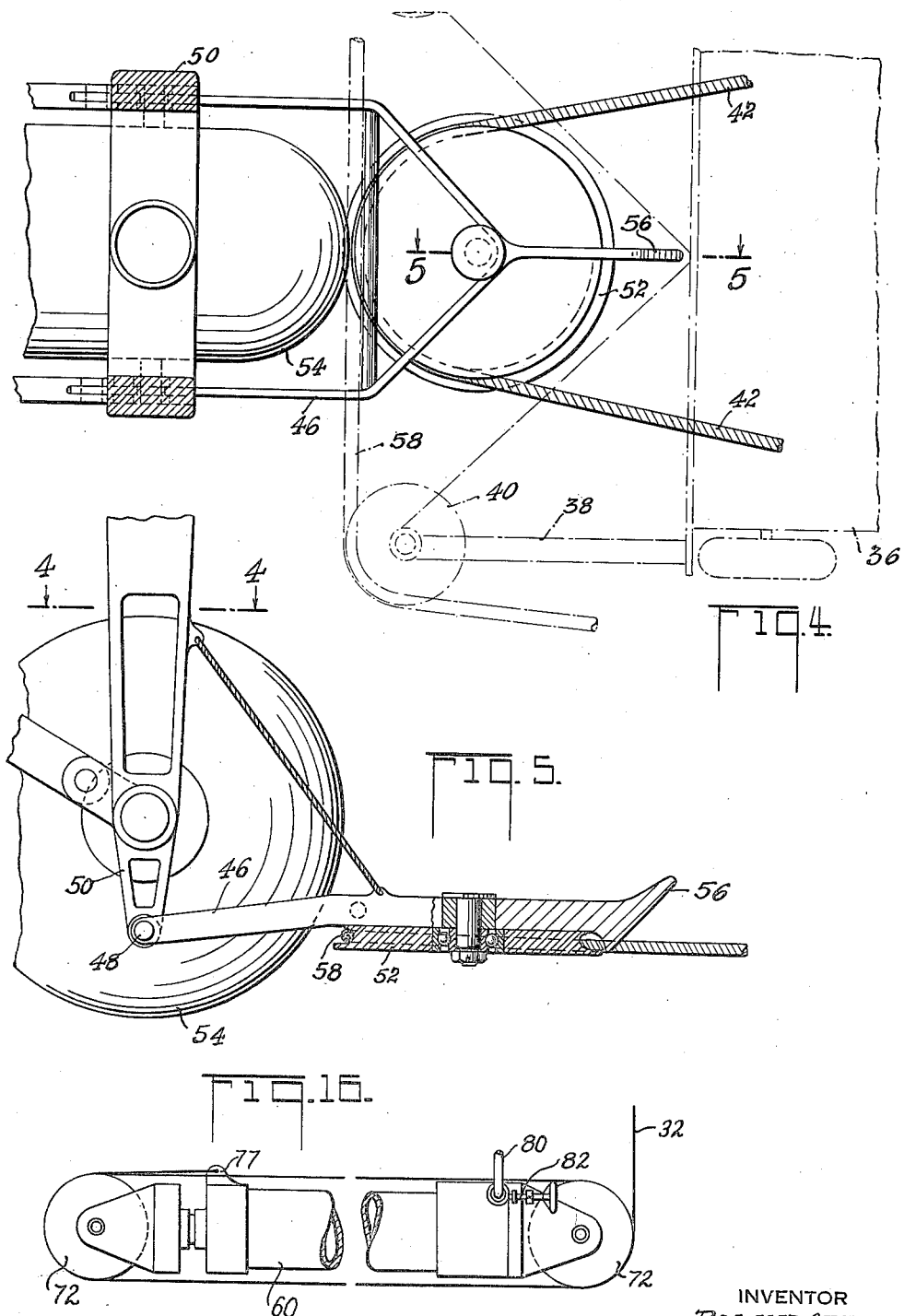

Jan. 31, 1939. R. CHILTON 2,145,685
MEANS FOR ASSISTING TAKE-OFF
Filed Oct. 5, 1937 7 Sheets-Sheet 4
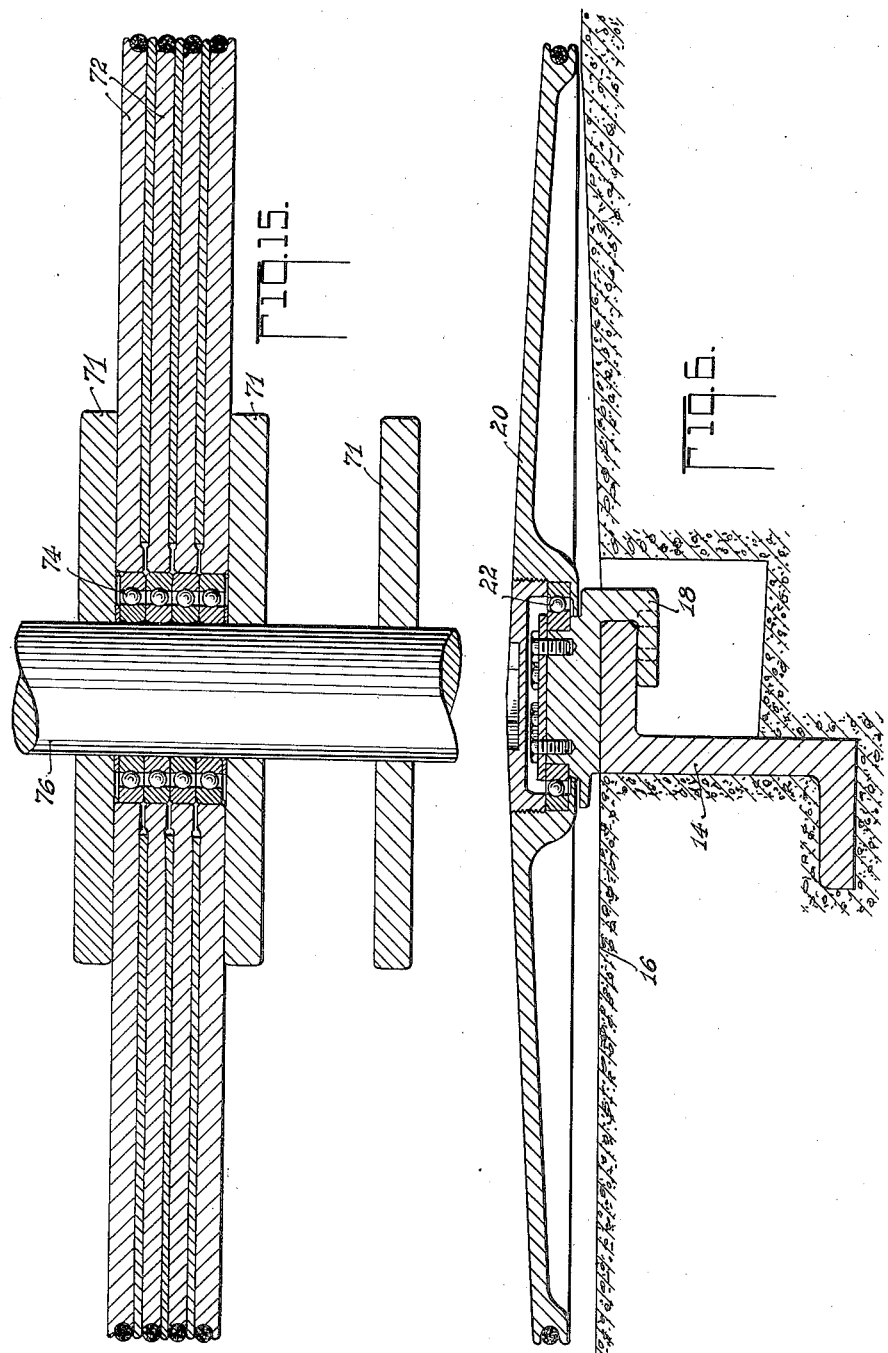
INVENTOR
ROLAND CHILTON
BY
ATTORNEY

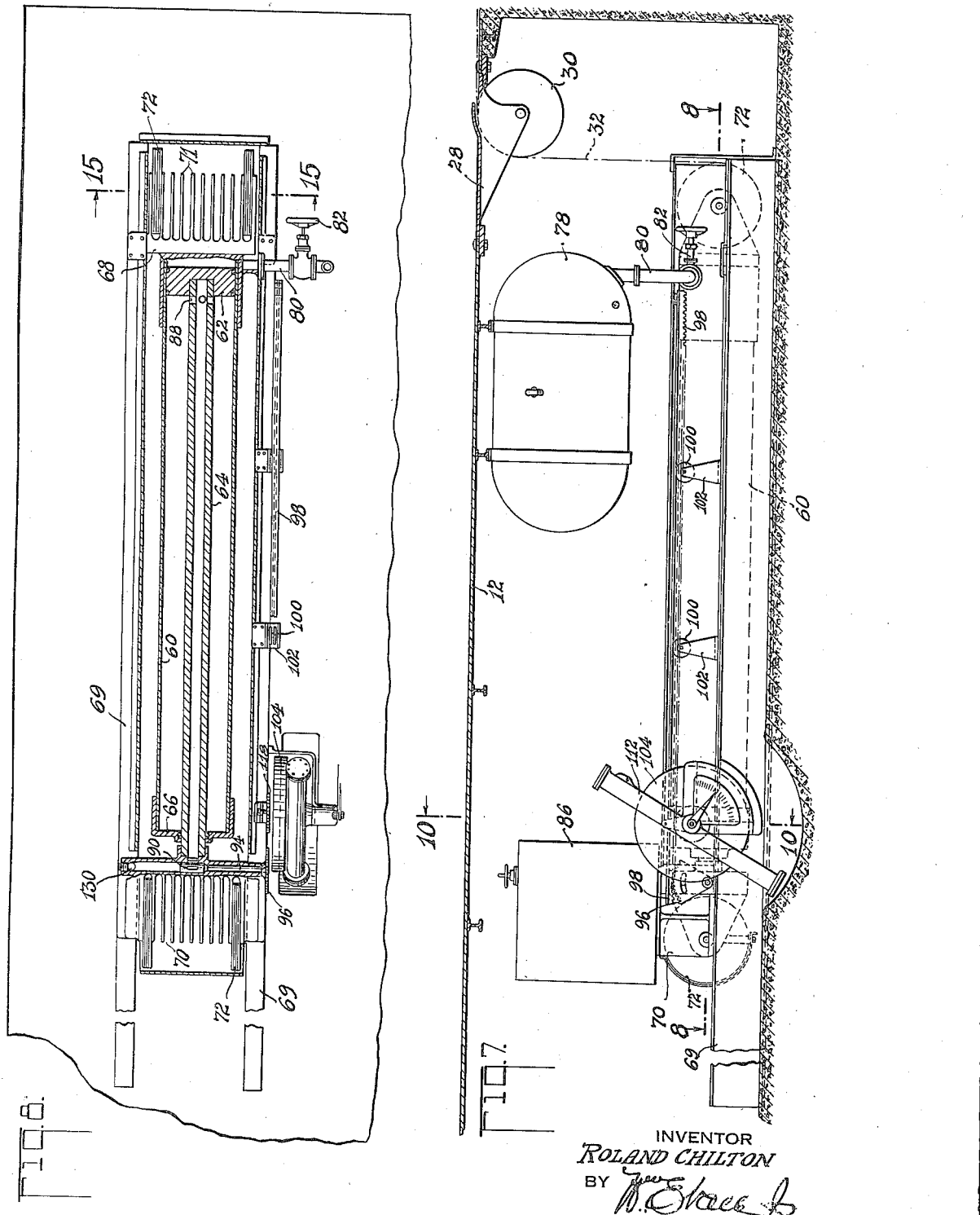

Jan. 31, 1939.  R. CHILTON  2,145,685
MEANS FOR ASSISTING TAKE-OFF
Filed Oct. 5, 1937  7 Sheets-Sheet 6

INVENTOR
ROLAND CHILTON
BY
ATTORNEY

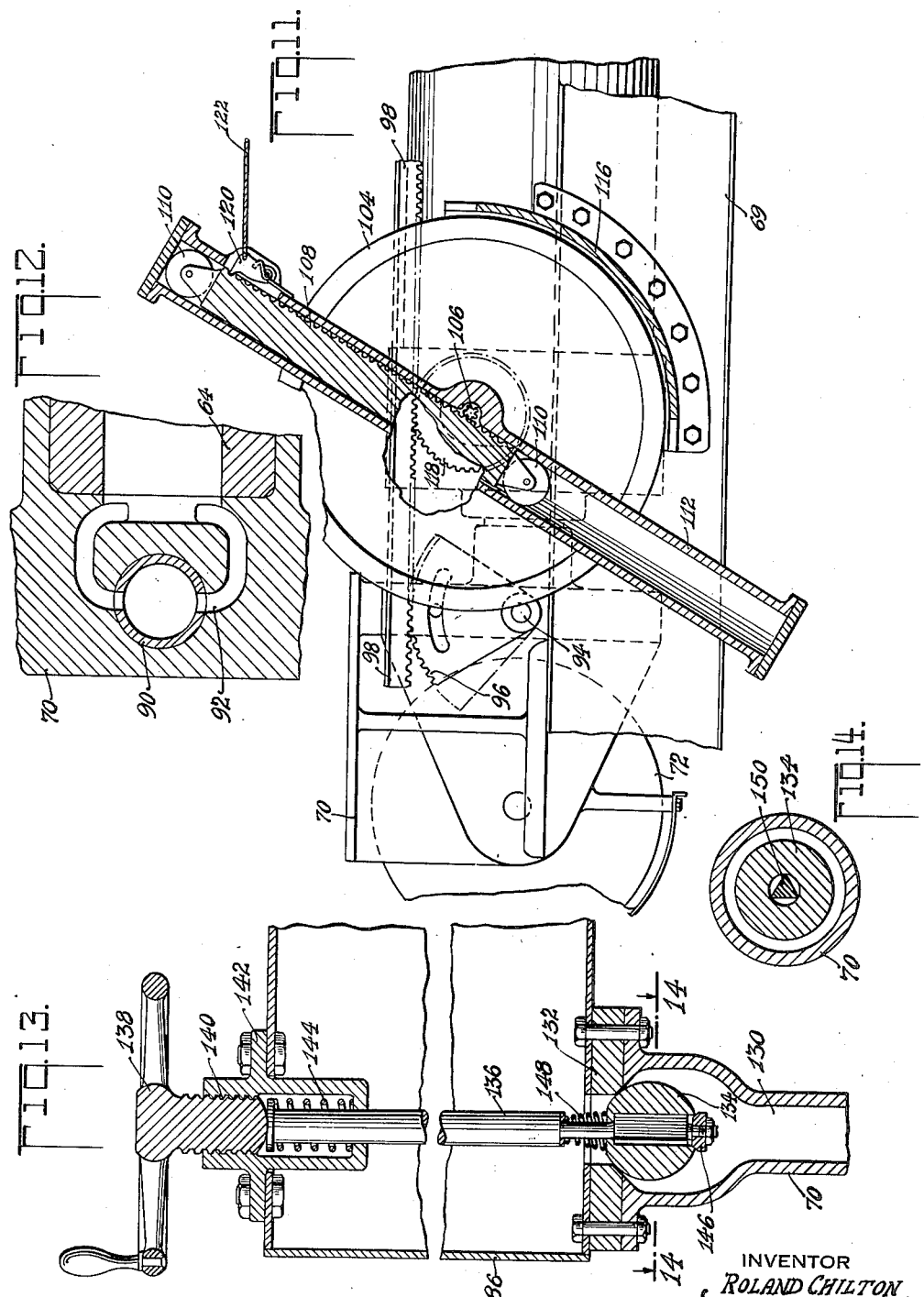

Patented Jan. 31, 1939

2,145,685

UNITED STATES PATENT OFFICE 2,145,685

MEANS FOR ASSISTING TAKE-OFF

Roland Chilton, Ridgewood, N. J.

Application October 5, 1937, Serial No. 167,341

12 Claims. (Cl. 244—63)

My invention relates to improved methods and means for assisting the take-off of airplanes, and in certain respects comprises improvements in the means described and illustrated in my co-pending application, Serial No. 158,658, filed August 12, 1937.

The development of aircraft to their present standards of performance has been accomplished by a steady increase in wing loading (lbs./sq. ft.) and indications point that this increase will continue with the further development of the art. This trend is accomplished by increased take-off speeds and, as the size of airplanes has increased, the take-off horsepower requirement has become one of the prime engine considerations for operation off the length of runways afforded by existing airports. The take-off horsepower required may be three times that used in actual cruising flight on long range operation.

The gross load which may be taken off by an airplane depends upon the take-off speed, being proportional to the square thereof, so that if the take-off speed can be increased 41% within the available runway length, the airplane gross load may be doubled, and, if all of this increased take-off capacity is utilized for extra fuel and tankage, the cruising range of the airplane may be quadrupled. The general objects of this invention are to provide improved ground equipment for accelerating airplanes to increased take-off speed within the length of run normally available. The detail objects and advantages of the invention will be obvious from or will be pointed out in the following description with reference to the drawings, in which:

Fig. 4 is a detail plan view in section on the line 4—4 of Fig. 5;

Fig. 5 is a part sectional elevation on the line 5—5 of Fig. 4;

Fig. 6 is a detail section through a movable ground cable pulley attachment;

Fig. 7 is a side elevation of the cable energizing device;

Fig. 8 is a plan section on the line 8—8 of Fig. 7;

Fig. 11 is an enlarged section on the line 11—11 of Fig. 10;

Fig. 12 is an enlarged sectional detail of the automatic control valve;

Fig. 13 is an axial detail section of the hand control valve;

Fig. 14 is a detail section on the line 14—14 of Fig. 13;

Fig. 15 is a detail section through the sheave axis 15—15 of Fig. 8, and

Fig. 16 is a fragmentary view showing the anchorage for the inner end of the cable.

Figure 1:
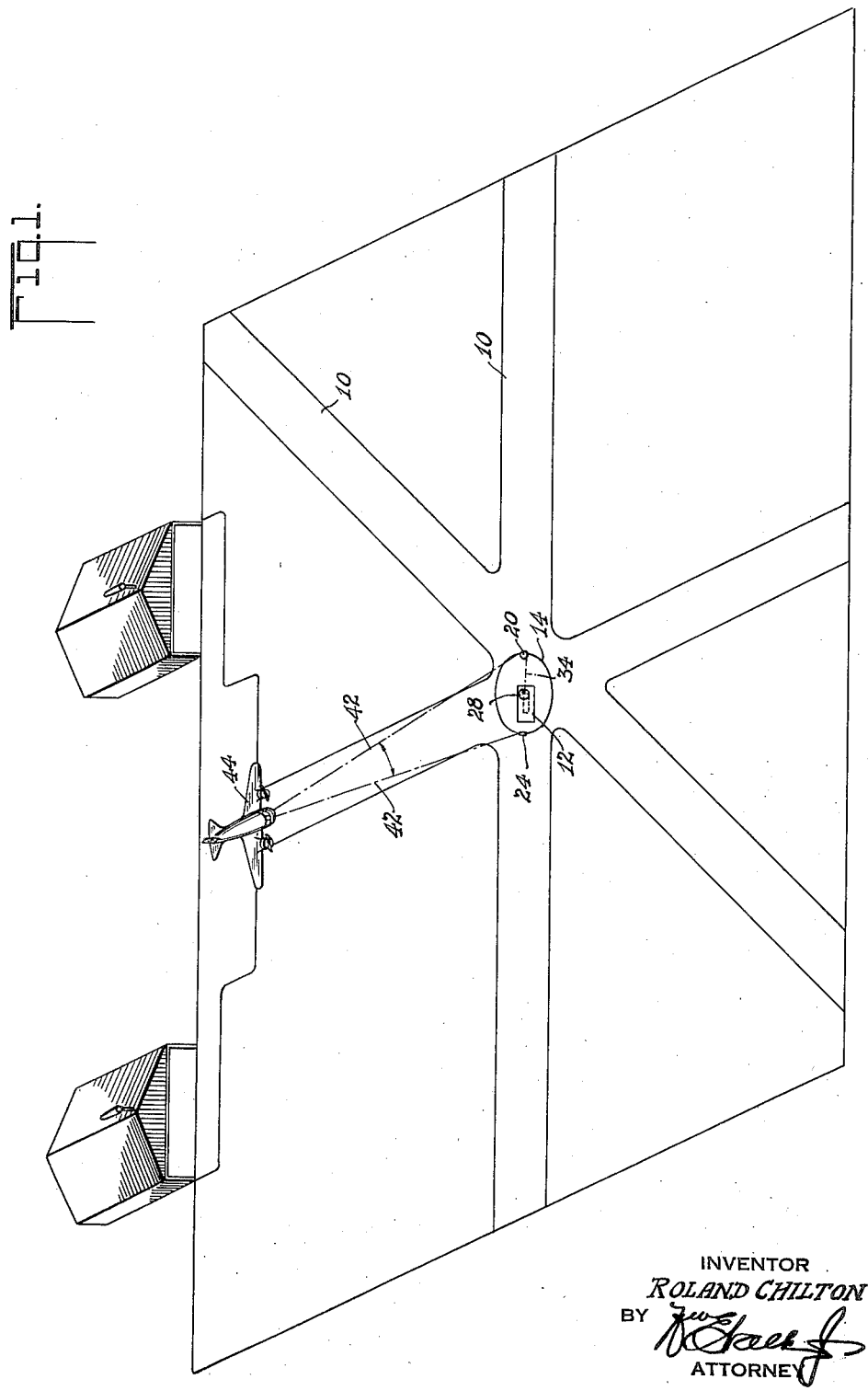
Fig. 1 is a diagrammatic view of an airport installation.

Referring first to Fig. 1, there is shown diagrammatically an airport having the usual runways 10, at the intersection of which there is provided a sub-surface power room having a roof 12 flush with the general surface of the runways and containing cable energizing means later to be described. Surrounding this is a circular rail or Z bar 14 seen in detail section in Fig. 6, and in enlarged plan view in Fig. 2. The Z bar is set flush with the general surface of the runway 16, Fig. 6, and is provided with a cable pulley-carrier 18 mounting a pulley 20 on a suitable anti-friction bearing 22. Diametrically opposite to the pulley-carrier member 18, there is disposed an anchor bracket 24, Figs. 1 and 2. The anchor 24 and the pulley-carrier 18 are maintained in diametrically opposite relation by circumferential cables 26 connecting them together and running around the outer circumference of the Z bar track 14. It will be seen that the pulley-carrier 18 and the diametrically opposite anchor 24 are slidable circumferentially around the Z bar track 14, whereby the assemblage may be oriented to lie at right angles to any of the several runways 10.

The power cellar roof 12 is equipped, centrally of the turntable track 14, with a rotatable carrier-bracket 28 carrying a pulley 30, and a towing cable from the power energizing means, later to be described, is led vertically upwards around this pulley as indicated at 32, Fig. 7, and then passes radially across the turntable at 34, Fig. 2, over the pulley 20, and thence back across to the anchorage 24 to which the end of the cable is permanently secured, whereby that portion 21 of the length of the cable lies diametrically across the turntable. This is the condition when the cable is fully payed in to the power or energizing means, and in this condition the entire cable assemblage comprising the rotatable outlet pulley 28, the track pulley 20, the track anchorage 24, with the cable leads 21, 34, may be rotated athwart any runway, the cable lying close to the runway surface as shown.

Figure 3:
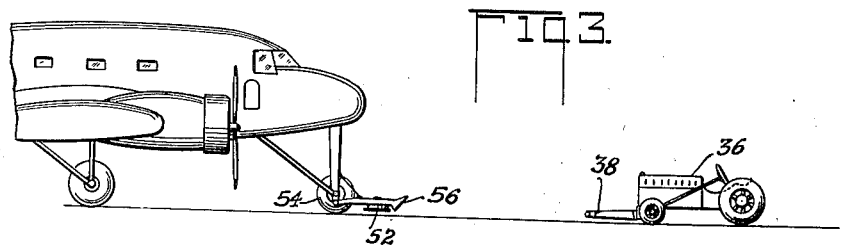
Fig. 3 is a small scale diagram illustrating the airplane cable attachment system.

In Fig. 3 there is illustrated diagrammatically a tractor 36 equipped in front with a cable handling-frame 38 (also shown dotted in the plan view of Fig. 4) including spaced pulleys 40, by means of which the cable element 21 may be picked up and a loop formed therein, and it is this loop which is carried out to the waiting airplane as shown at 42—44, Fig. 1.

The power means may be elastically pre-energized so that the tractor 36 operates against a pre-set cable pull, or alternately, the power means may be energized only after attachment of the cable to the airplane. This is effected by way of the pulley attachment illustrated in Figs. 4 and 5 wherein a pulley-frame 46 is hinged at 48 to the airplane landing gear 50 and carries the cable pulley 52 ahead of the landing wheel 54 as shown. The frame 46 is equipped with a forward angular nose piece 56 which contacts the element 58 of the cable stretched across the front of the tractor between the pulleys 40 thereon; this contact serving to lift the frame 46 and pulley 52 whereby the cable passes thereunder until brought to the position 58, Fig. 4, whereupon the frame 46 will fall; engaging pulley 52 with the cable, which engagement is completed by backing away the tractor to establish the condition shown in full lines in Figs. 4 and 5.

The cable now runs from the lead-out pulley 30 at the center of the turntable, over the ground pulley 20, out to the airplane where it is looped around the airplane towing pulley 52 and thence back to the anchor member 24.

In the case where the cable is payed out by the tractor under tension from the energizing device, the tractor is equipped with a "ratchet" means later to be described, whereby the cable is relieved of pull as soon as the tractor power is shut off. When the tractor has transferred the cable to the pulley 52 and backed out of the way, and the pilot has his engine or engines (as the case may be) wide open, the cable energizing means will be released by the operator and the assisted take-off will proceed with the energizing device pulling or winding in the cable. Alternately, the energizing means may be so organized that the cable is payed out substantially free of load, and the towing pull subsequently applied when the pilot is in readiness. In either event, the assisted acceleration proceeds with the cable loop 42 shortening until it is once more stretched straight diametrically across the turntable as at 21, Fig. 2, whereby the cable and energizing means are shocklessly brought to rest under tension, and the airplane pulley 52 leaves the now stationary cable which is over-run by the wheel 54, whereafter the airplane is completely free and the pilot may initiate his actual take-off.

The looped disposition of the cable between a ground anchorage and a ground pulley is one of the prime features of the invention, since it avoids the difficulty encountered in cable towing devices when a free end of the cable is necessarily traveling at high speed at the instant of release and the problem of controlling this cable to prevent the possibility of its fouling the airplane and/or unwinding from the energizing means is avoided by the loop system of the present invention wherein the cable is at all times under restraint.

In certain cases it may be desirable to mount the airplanes on a carriage, as is now done on naval catapults, and with present methods, the deceleration of such a carriage from the high speed of airplane take-off has presented serious problems. In the present case, with an elastic energizing means, this deceleration is fully automatic. Should a carriage be used, it would be restrained from over-running the cable so that, at the end of the take-off run, after the cable has reached the straight position of 21, Fig. 2, the carriage will be automatically and elastically decelerated since the stored energy therein would cause it to continue in its travel by reversing the loop in the cable against the elastic resistance of the energizing device which would shortly bring the carriage to rest.

Any elastic energizing means may be used with the novel cable disposition of this invention, and, in fact, the elastic energy may be stored in the cable itself which would then be constructed of rubber strands as in the conventional shock cord as used in airplane landing gears. In any event, and whether the necessary elastic tension is in the cable itself or in a hydropneumatic energizer as now to be described, it will be seen that the cable is under control at all times and remains under tension while the airplane disengages and after the airplane has taken off so that there is no possibility of the cable whipping in an uncontrolled manner.

Figure 2:
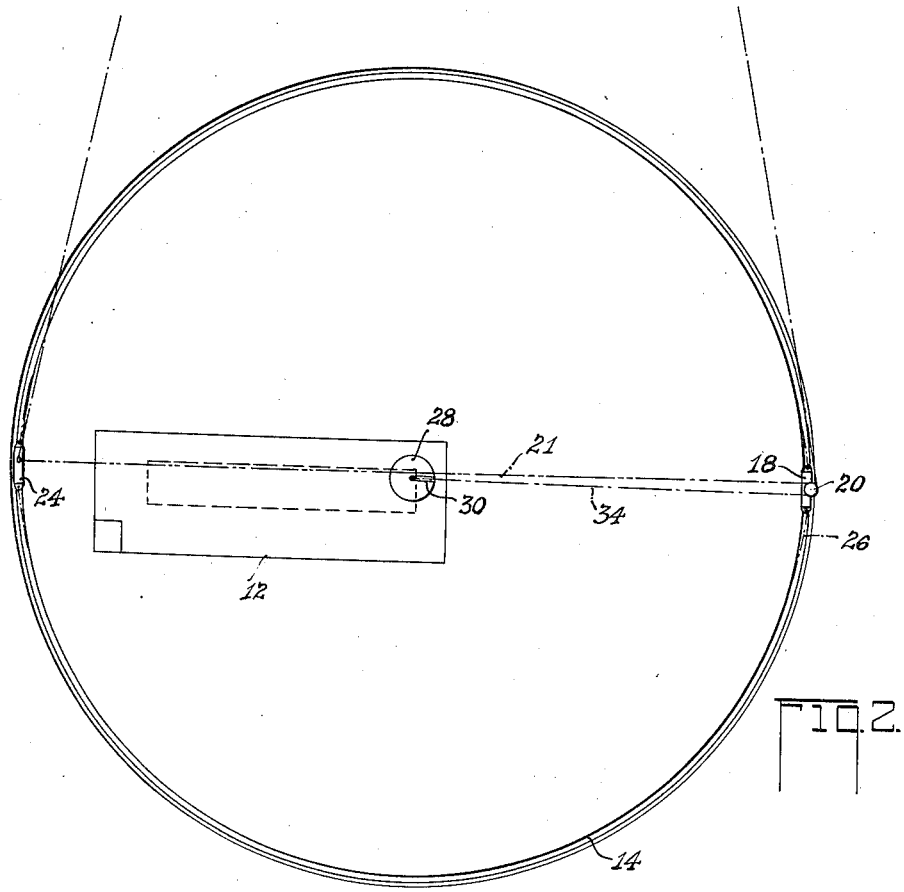
Fig. 2 is an enlarged diagram of the central portion of Fig. 1.

In my improved system the cable is never more than a few inches above the ground, while at the same time, the deceleration of the cable and any associated moving parts, such as the energizing device and/or a launching carriage, is automatically and shocklessly affected by the progressive increase in angle of the cable loop 42, Fig. 1, to the straight line condition (21, Fig. 2). It should be understood that, as the angle 42 of the cable loop increases towards this 180° final position, the velocity of the cable and associated parts is smoothly and progressively reduced to zero. This is accomplished by a progressive reduction in the towing pull effective on the airplane as the airplane passes the turntable zone, the pull reaching zero at the instant of release when the cable becomes straight, even though the cable itself remains under full tension. This action is analogous to that of the traditional bowstring.

As previously stated, any suitable energizing means may be used with this invention including the provision of the necessary elasticity in the cable itself. For the handling of very large airplanes, however, the hydropneumatic energizer now to be described may be preferred.

Referring first to Fig. 8, this comprises a fixed cylinder 60 having a piston 62 and tubular rod 64 extending through a cylinder end-cover 66. The cylinder 60 has a fixed head 68 while the piston rod 64 is equipped with a similar but moving head 70 suitably guided on I-beams 69 on which the cylinder 60 is rigidly mounted as shown. These heads have comb-like projections 71 between which are mounted multiple sheaves 72, one cluster of which is shown in enlarged detail in Fig. 15 where it will be seen that each sheave 72 is mounted on an individual anti-friction bearing 74 supported on a large spindle 76 engaged in each of the projections 71.

Reeved serially from an end anchorage over successive sheaves 72 is the towing cable, which passes upwards from the end sheave of the cylinder at 32 as previously described. After passing serially over all the sheaves the inner end of the cable is anchored as at 77 (see Fig. 16) to comprise means whereby the velocity and travel of the outgoing cable 32 is increased in proportion to the total number of sheaves and cable passes, the apparatus comprising in this respect the inverse of conventional pulley blocks. In this instance, forty sheaves are shown in each of the moving and fixed heads, whereby the travel and velocity of the cable will be eighty times that of the hydraulic piston 62 with the plunger 64 and the moving head 70.

Figure 9:
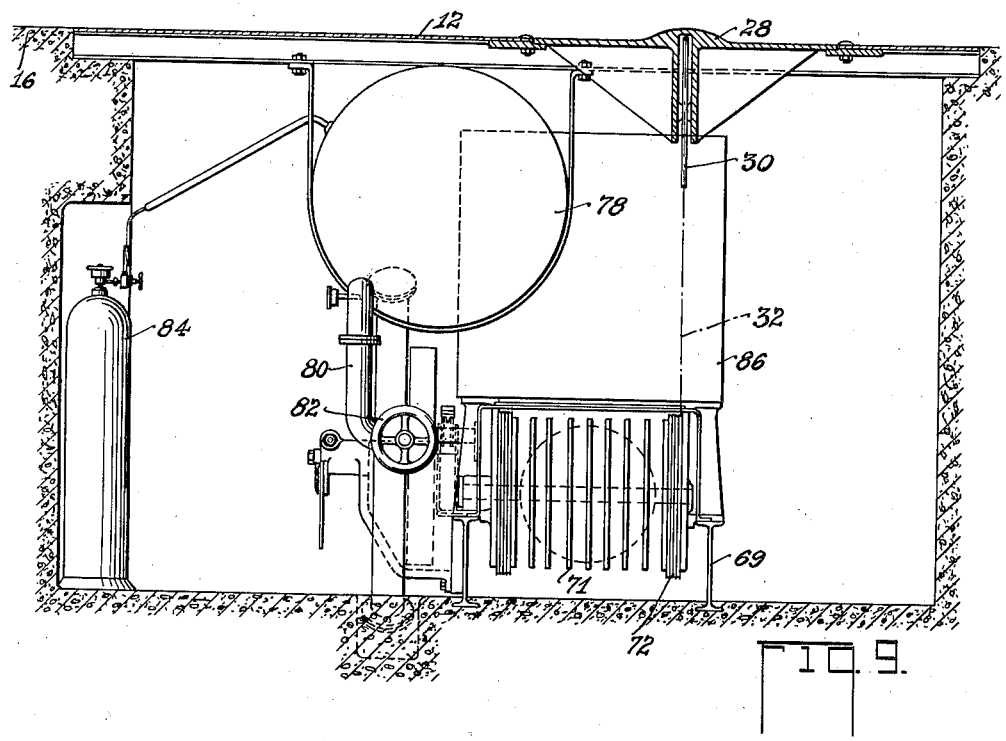
Fig. 9 is an enlarged end view of the structure shown in Figs. 7 and 8.

These parts may be energized by any suitable medium, preferably by compressed air stored in a suitable tank 78, Fig. 7, by way of a pipe 80 and hand control stop valve 82 whereby the air pressure is effective on the right hand side of the piston 62. Auxiliary supply of compressed fluid for the tank 78 may be stored in flasks such as indicated at 84, Fig. 9, or a suitable power driven compressor may be provided.

Figure 10:
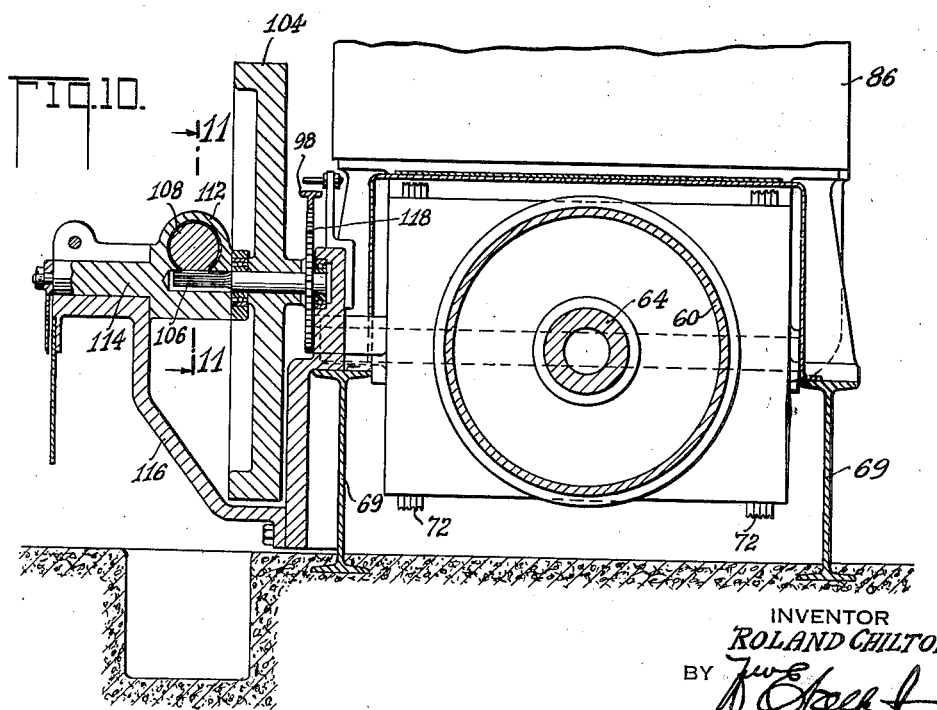
Fig. 10 is a further enlarged detail section on the line 10—10 of Fig. 7.

The cylinder 60, to the left of the piston 62, is filled with water and communicates with a tank 86 mounted on the moving head 70 as shown in Fig. 7. This communication between the tank 86 and the cylinder 62 is by way of holes 88 communicating with the hollow piston rod 64 which in turn communicates with a control valve 90 carried in the moving head 70 and shown in enlarged detail in Fig. 12, in the open position, wherein the valve establishes communication between the water tank 86 and the hollow piston rod 64 by way of ports 92. The valve 90 has a shaft 94 extending from the moving head 70, and to this extension there is fixed a toothed quadrant 96, Figs. 11 and 8. Engaged with the quadrant 96 is a long floating rack 98, Figs. 11, 10, 8 and 7, and this rack is supported on light rollers 100, carried in suitable fixed brackets 102, as seen in Fig. 7, and may follow the movement of the moving head 70 under the control of an acceleration metering device now to be described, with particular reference to Figs. 10 and 11. This automatic control device comprises a relatively heavy flywheel 104, having a small pinion 106 with which is engaged a weight rack 108 guided by anti-friction rollers 110, in a tubular guide 112, which may be angulated in a trunnion 114 supported in a suitable fixed frame 116. The flywheel also carries a gear 118 which is meshed with the connecting rack 98. The weight 108 may be retained in its upper position by suitable ratchet mechanism 120 which may be tripped by a control cable 122, Fig. 11, when it is desired to energize the device.

The operation of the acceleration control is as follows: When the weight rack 108 is released, it starts to fall under the action of gravity, thereby accelerating the flywheel 104 through the pinion 106, the rate of acceleration being adjustable by pre-setting the inclination of the guide 112 whereby any steady rate of acceleration of the flywheel 104 may be selected. The gear 118 communicates this acceleration to the rack 98 which will move leftwardly, thereby opening the control valve 90 through the quadrant 96. This immediately permits water to flow from the left hand side of the piston 62 through the hollow rod 64 and into the tank 86. The right hand side of the piston 62 is subject to fluid pressure from the tank 78 so that the piston 62 and the head 70 start to move, pulling in the cable 32 to the sheaves. However, the valve 94—90 with the quadrant 96 is carried along by the head 70 in its movement, and, should the head 70 attempt to move faster than the metered acceleration rate of the rack 98, such over-run of the head 70 will move the control valve 90 towards its closed position. Thus, whenever the rate of movement of the head 70 falls below the metered rate of movement of the rack 98, the control valve 90 is opened, and vice versa. It will be clear that the rate of acceleration of the connecting rack is proportional to that of the flywheel since these are connected by the gear 118, and that the rate of acceleration of the flywheel is again proportional to the rate of acceleration of the rack weight 108 since these are connected by the pinion 106 and as the latter weight is accelerated by the constant force of gravity, its acceleration is dependent upon the angle at which the guide 112 is set.

An automatic one-way valve openable by hand to control the flow of water from the back of the piston 62 to the tank 86 is also provided. This valve is in series with the automatic valve 90 as shown in Fig. 13 in which 130 designates the upper portion of the passageway formed in the head 70 to connect the valve 90 to the tank 86. A valve seat member 132 cooperates with a ball valve 134 operated by a stem 136, by means of a hand wheel 138, screw-threaded at 140 into a fitting 142, secured at the top of the tank 86 as shown. This fitting includes a valve-closing spring 144, and the stem 136 cooperates with the ball valve 134 through a small pilot valve 146 against which the ball is normally maintained seated by a spring 148, the stem 136 having a triangular portion 150, Fig. 14, on which the ball 134 is guided.

The operation on this hand control valve is as follows: In stand-by periods the hand wheel 138 will be unscrewed, permitting the spring 144 to bring the parts to the position shown wherein the ball valve 134 and the pilot valve 146 are both seated. The device acts as a one-way spring-loaded valve positively preventing any flow of water from the piston 62 and passage 130 into the tank 86, but permitting reverse flow as the piston 62 is retracted, as when towing out the cable as by means of the tractor 36 previously described. Under this condition the hydraulic system comprises a ratchet permitting movement of the piston 62 with the head 70 to the right of Figs. 6 and 7 but positively prevents any return movement until the valve 134 is opened by the hand wheel 138. That is to say, in the case of energization of the device by pulling out the cable, as when tractor 36 is used, elastic retraction of the cable due to the fluid pressure on the right hand side of the piston 62 is positively prevented by the hydraulic system. Similarly, even though a failure in the cable or its attachments should occur, the piston 62 and head 70 will be positively restrained in position by this hydraulic ratchet even though the pneumatic valve 82 be opened.

It will be appreciated that in this system, the gross pneumatic loads on the piston 62 and its head 70 are very high, being eighty times the towing cable tension in the case of forty sheaves per end as before described. At the same time, the energy stored in the compressed air behind the piston 62 (including that in the tank 78 when the valve 82 is open) will amount to several million ft. lbs., which would produce extremely dangerous accelerations of the ram in the event of cable failure but for the positive control afforded by the hydraulic system. This safety control is twofold, i. e., during the actual take-off when the non-return valve 134 is open, the rate of acceleration of the piston 62 is positively limited by the automatic hydraulic acceleration control valve 90 as previously described, and during energization, there is the additional safety factor due to the one-way action of the valve 134. It is contemplated that the rate of work performed by the piston 62 during the actual towing operation may be of the order of 1000 H. P. or upwards for a period of twenty seconds or less, while regeneration as by the tractor 36, will proceed at a slow rate, with the tractor in low gear, whereby a machine of commercially available horsepower will be sufficient.

Alternately, the reenergization may be done by suitable hydraulic pumps taking water from the tank 36 and delivering it under pressure to the left hand side of the piston 62. In this case the pull required at the tractor 36 or its equivalent would be merely that necessary to keep a slight tension on the cable to maintain it in contact with the various sheaves. This may also conveniently be effected by means of a light handling line operated by a low powered winch at the end of the runway.

The operation of the entire system may be recapitulated as follows: The airplane being in position at the end of the runway, the device is energized while towing out the cable loop, as by the tractor 36 or by a suitable cable and winch which may supply the entire energy needed, or, alternately, this energy may be supplied by hydraulic power pumps delivering water from the tank 13 to the left hand side of the piston 62, in which case the function of the tractor or payout winch will be merely to prevent the cable slacking off. The cable having been engaged with the towing pulley 52 of the airplane as previously described, all is in readiness for the assisted take-off run. It will be understood that as soon as the tractor 36 backs up to transfer the cable to the airplane pulley 52, the hydraulic system acts as a ratchet restraining the movable head 70 from following up the retraction of the cable which is, accordingly, relieved of pull.

When all is in readiness, the operator will check that the acceleration control valve 90 is closed and will open the non-return valve 134. He will then release the latch 120 of the acceleration control device, Fig. 11, and the weighted rack 108 will slowly accelerate the flywheel 104 and with it the rack 98, slowly opening up the valve 90 and releasing the restraining water pressure on the left hand side of the piston 62 via the open valve 134. The acceleration of the piston 62 then proceeds at the rate metered by the rack 98 from the flywheel 104 under the influence of the falling weight 108, all as previously described.

As the airplane enters the turntable zone, the angle formed by the two sides of the cable increases and as the cable reaches the straight position (21, Fig. 2) the cable and the energizing piston 62 are brought smoothly to rest, the airplane towing pulley 52 leaving the cable which is overrun by the airplane wheels 54 and the pilot is entirely free of the assisting gear and is free to make his actual take-off.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. Means for assisting the take-off of an airplane from a terrain having intersecting runways including a circular track fixed at said intersection; cable anchoring and lead-in means disposed at diametrically opposite points in said track; a cable initially stretched between said means which may be swung around said track so that the cable lies athwart the runway to be used; and means whereby a loop is payed out in said cable to engage the airplane to be assisted.

2. In combination; a fluid pressure ram and cylinder, one of which is movable; a fluid pressure control valve carried by the movable member; a flywheel rotatably supported on the fixed member; a weight connected to the flywheel to impose a predetermined rate of acceleration thereon; and a connecting member organized to partake of the acceleration of the flywheel and to control said valve.

3. In combination with a member subject to an accelerating force; a hydraulic valve carried by the member and adapted to control the rate of acceleration thereof; and control means for said valve including a flywheel rotatable in fixed bearings, a weight connected with the flywheel to impose a given rate of acceleration thereon, and connecting means between the flywheel and the valve whereby the latter is moved relatively to said member whenever the rate of acceleration of said member tends to depart from that imposed on the connecting means by the flywheel.

4. In apparatus of the class described, a cable; means whereby a portion of said cable is disposed just above a take-off surface, said means being rotatable relative said surface so that the cable may be adjusted to lie normal to the desired take-off path of an airplane, and said cable being adapted to have a loop pulled out to engage the airplane; and means associated with the cable to elastically contract said loop to the initial straight condition.

5. Means for assisting the take-off of an airplane from a terrain comprising a circular track therein, an anchor means and a pulley means disposed at opposite points on said track and rotatable therearound, elastic cable energizing means disposed in a cellar beneath said terrain, and a cable issuing from said energizing means at the center of said track and passing over said pulley means to said anchor means.

6. Means for assisting the ground take-off run of an airplane comprising a cable and means between which said cable is stretched across the take-off path of the airplane, said last mentioned means comprising an anchor member and a pulley member, and means for rotating said members in unison relative to the ground.

7. Means for assisting the ground run of an airplane comprising an elastic energizing device disposed in a sub-cellar having a roof flush with the ground, a cable issuing from said roof, a circular track substantially concentric with the point of cable issuance, and anchor and pulley means conjointly rotatable around said track, said cable being looped over said pulley means to said anchor means.

8. An airplane launching means including a circular track, anchor and pulley means rotatable around said track, elastic cable energizing means and a cable issuing from said means centrally of said track and passing over said pulley to said anchorage, and means to form a loop in said cable and to carry said loop to the airplane to be launched.

9. Means for assisting the take-off of an airplane comprising a cable disposable across the end of the take-off path, means to elastically stretch said cable in said position, and means to form a loop in said cable for engagement with the airplane when initially disposed at the beginning of said path, said elastic means being effective on the cable for deceleration thereof after the airplane has been launched.

10. In apparatus of the class described, a cable, a cable anchor means, a pulley means and an energizer elastically resisting deflection of said cable from a static condition stretched straight between said means, and means to force a loop in said cable for engagement with an airplane to be launched.

11. Means for assisting the take-off of an airplane having a towing cable attachment, said means comprising a lead-in pulley, an elastic cable energizing device, and a cable anchored at each of its ends and looped intermediate said ends over said attachment, over said energizing device, and over said pulley.

12. Launching means for an airplane having an attachment means engageable by a cable loop comprising a cable energizing means, and a cable looped intermediate its ends over said attachment and over said energizing means, said cable being anchored at both of its ends.

ROLAND CHILTON.